United States Patent [19]
Holland

[11] Patent Number: 5,993,372
[45] Date of Patent: Nov. 30, 1999

[54] METHOD AND APPARATUS FOR COLLECTING AND CONTAINING HYDROCARBON SPILLS AND LEAKS

[76] Inventor: Herbert W. Holland, 2314 Chimney Rock, Houston, Tex. 77056

[21] Appl. No.: 08/962,975

[22] Filed: Oct. 30, 1997

[51] Int. Cl.⁶ .................................................. F16N 31/00
[52] U.S. Cl. ..................... 588/255; 588/900; 210/692; 210/694; 210/282; 210/337; 184/106
[58] Field of Search ..................... 588/255, 900; 405/128, 52; 184/106; 210/692, 694, 282, 337, 502.1

[56] References Cited

U.S. PATENT DOCUMENTS

| | | | |
|---|---|---|---|
| 5,451,325 | 9/1995 | Herkenberg | 210/693 |
| 5,518,797 | 5/1996 | Holland | 428/132 |
| 5,711,402 | 1/1998 | Sumpter, Sr. | 184/106 |

*Primary Examiner*—William Neuder
*Assistant Examiner*—Zakiya Walker

[57] ABSTRACT

A method and apparatus for collection and containment of hydrocarbons that may be spilled or leaked by equipment utilizing an internal combustion engine, transmission or fuel tank prevents pollution of the environment. Hydrocarbons accumulated in a spill collection apparatus are directed to a spill containment device where they are absorbed and solidified into a rubber-like mass. Solidification of hydrocarbons and retaining them within a hydrocarbon impermeable housing prevents them from contaminating the surface below the equipment and facilitates their handling for disposal.

58 Claims, 7 Drawing Sheets

FIG. 8

METHOD AND APPARATUS FOR COLLECTING AND CONTAINING HYDROCARBON SPILLS AND LEAKS

BACKGROUND OF THE INVENTION

The present invention relates to a method and apparatus for collecting and containing hydrocarbons that may be spilled or leaked by internal combustion engines. The instant method and apparatus further provide a variety of environmentally sound handling and disposal options for the accumulated hydrocarbons.

In a broad range of applications, there is a need to contain and remove contaminants that are spilled or leaked into the environment as part of the routine operation of motor vehicles and machinery powered by internal combustion engines that utilize liquid hydrocarbon products as fuels or lubricants. This critically important task is necessary to prevent pollution of the environment by spilled or leaked hydrocarbons that may flow downstream as wastewater runoff or seep into soil and contaminate an adjacent column of groundwater.

One common approach to the task of removing spilled or leaked liquid hydrocarbons is to utilize sorbent devices to absorb the contaminants. A wide variety of components, including cotton, peat moss, rice hulls and ground-up corn cobs are used to fabricate these devices. One such device relies on ground-up chicken feathers encased in a cotton pillow case.

The largest class of sorbent devices is typically comprised of a group of non-woven, petro-chemical based fabric materials having the physical properties of sorbing liquid hydrocarbons while repelling water. These devices are typically packaged as flat pads or cylindrical booms. Prior art absorbent devices of this type may allow liquid hydrocarbons to pass through the device and on to the surface where they are placed. The contaminants are then free to soak into the ground and pollute the soil or stain the surface beneath the source of the spill or leak, such as a driveway, street or road, with a film of liquid hydrocarbons. Liquid hydrocarbons absorbed by such devices are subject to release by gravity, column weight or outside forces exerting pressure on the devices as they are removed from a spill area. Disposal of these devices typically results in merely transferring substantial volumes of sorbed liquid hydrocarbon pollutants from one venue to another, where additional remediation activity is required.

Engines of motor vehicles, machinery and equipment are most likely to leak hydrocarbon fuels and lubricants when they are in operation. This is due to the elevated operating temperature, increased engine crankcase pressure, flow of fuels and lubricants and operation of a transmission while an engine is running. Fuels and lubricants that flow through a running engine may come in contact with loose-fitting gaskets, broken seals and leaking pumps, piping and other connections. Hydrocarbons may then seep through the cracks and fissures found in these seals and conduits and drip or leak on to the surface below the equipment.

Liquid hydrocarbons that may accumulate on the exterior of an engine or transmission of a piece of equipment may spill on to the surface below the equipment when the equipment is moving or when it is stationary. This can be demonstrated. A variety of establishments, such as fast food restaurants and banks, maintain drive-through windows that allow their customers to remain in their vehicles while transacting business. The driveway surfaces proximate these service windows are typically stained with a coat of hydrocarbon fuels and lubricants that have been emitted by vehicles that have parked adjacent the drive-up window. Similar driveway stains may be found at truck fueling depots, parking lots and other areas where vehicles operate with running engines.

On highways and streets, hydrocarbon stained roadway surfaces typically indicate an uneven road surface. Globules of hydrocarbons that may accumulate on the outer surfaces of an engine or transmission may become dislodged when a vehicle encounters a rough section of roadway and fall on to the road surface, staining the surface with a coat of hydrocarbons.

Overflow from fueling operations may spill directly on to the surface below a vehicle. Fuel overflow may also accumulate on the side of the equipment, along the conduit leading to the fuel tank from the fuel intake port and on the top and sides of the fuel tank. Spilled hydrocarbons may then be free to leak into the environment when a vehicle leaves a fueling depot.

In each instance, stains at drive-through windows and on driveways, parking lots and road surfaces may be caused by hydrocarbon spills and leaks. When hydrocarbon droplets are of a sufficient weight, or become dislodged by the bumping or bouncing motion of a vehicle, they may detach from the equipment and stain the surface below it.

Significant amounts of water may accumulate in the bilge of a marine vessel from deck washing procedures, leaking stuffing boxes where the drive shaft of an engine extends through the hull of the vessel or sea water that may splash on to the deck of the vessel. Bilge water must be treated before it can be pumped out of the vessel and discharged into the environment.

Hydrocarbon fuel, lubricant and transmission leaks on marine vessels often find their way into the bilge of the vessel with the accumulated water. Bilge water containing fuel, oil and other hydrocarbons may also come in contact with soaps and detergents used in deck washing and equipment cleaning operations, with the soap typically creating a chemical emulsion of the hydrocarbons that come in contact with the surfactant.

Emulsified oil may not be readily extracted from bilge water by on board oil/water separation devices utilizing gravity separation and coalescing methods to remove oil from water. Further, the prior art devices are usually ineffective in removing hydrocarbons from the bilge of a vessel because they typically float on the surface of the bilge water and may not come in contact with emulsified hydrocarbons found throughout the water column. Thus, on board separation equipment and sorbent devices may not be capable of treating bilge water containing emulsified hydrocarbons to an acceptable quality for discharge into the environment. This results in an additional expense to the vessel operator when the soapy, oily bilge water is pumped to a dockside treatment facility for proper disposal.

Placement of the prior art sorbent devices in close proximity to a running engine may result in the non-woven textile devices melting and losing their structural integrity due to the elevated operating temperature of the engine.

Thus, hydrocarbon spills and leaks of internal combustion engines, fuel tanks and transmissions may create environmental problems that may not be readily solved by utilization of the prior art devices.

SUMMARY OF THE INVENTION

In accordance with the present invention, a method and apparatus are provided to collect hydrocarbon fuel and lubricant spills and leaks of internal combustion engines proximate their source. Spilled or leaked hydrocarbons may be directed to an elastomer polymer enclosed within the housing of a spill containment device, the polymer having the capacity to absorb and solidify the hydrocarbons into an easily retrievable rubber-like mass that remains within the spill containment device.

The instant method provides for collection of spills and leaks from beneath engines, transmissions and fuel tanks of hydrocarbon fueled or lubricated equipment and containing the spills and leaks to form a solidified mass. Collection, containment and solidification facilitates the removal and disposal of the contaminants and prevents pollution of the environment by free flowing hydrocarbon substances. Further, the instant method of spill and leak containment allows spill collection and containment to be continuously afforded to automobiles, trucks, tractors, marine vessels, generators, compressors and other types of mobile machinery with no regard to whether the vehicle is in motion or in a fixed location. Thus, spill collection and containment may be continuously utilized in spill prevention and remediation rather than in the intermittent manner provided by merely placing an absorbent device beneath a vehicle or a piece of equipment in a stationary position.

The present invention may utilize a hydrocarbon impermeable material to form and define the overall shape of a spill collection apparatus and a spill containment device.

A spill collection apparatus may be configured to accumulate spilled or leaked hydrocarbons and direct them to a spill containment device. A spill containment device may be formed in a suitable configuration to receive accumulated hydrocarbons and expose them to a hydrocarbon solidifying polymer-based media. A spill collection apparatus may be modified to also serve as a spill containment device to retain accumulated hydrocarbons for absorption and solidification by the polymer-based media.

Collected contaminants entering a spill containment device may be dispersed throughout the device for absorption and solidification by the polymer-based media. Thus, the spill collection apparatus and the spill containment device prevent spilled or leaked hydrocarbons from contaminating the surface below the leaking equipment.

The polymer-based media may be placed within a spill containment device and arranged to provide maximum surface area exposure of the hydrocarbon solidifying polymer to free flowing contaminants and allow for the expansion of the polymer as it absorbs and solidifies hydrocarbons.

A mounting bracket may be used to provide support for a spill collection apparatus or a spill containment device and hold them in place. For example, a bracket may be attached to the frame of a truck so that the spill control apparatus may be located beneath the engine, oil pan, fuel tanks and transmission of the vehicle.

Solidified hydrocarbons may be retained within a spill containment device to facilitate their handling for disposal. Replacement of spent hydrocarbon solidifying media requires the removal of the spill containment device and replacing it with a device having a fresh supply of the polymer-based media.

The instant method and apparatus may utilize a variety of embodiments of the spill control apparatus. One embodiment may utilize a disposable collection/containment device having the polymer-based media within a hydrocarbon impermeable housing that may define the overall shape of the device. Another embodiment may employ a fixed spill collection apparatus that may be used to accumulate hydrocarbon spills and leaks and direct the collected hydrocarbons to a spill containment device.

A spill containment device may be configured to provide access to a replaceable array of the polymer-based media within a reusable housing, or it may be configured as a throw away unit having a supply of the polymer-based media within a disposable housing. In each instance, a fresh supply of polymer-based media having a capacity to absorb and solidify hydrocarbons may be easily substituted for a spent supply of the polymer-based media.

For example, a spill collection and containment device may utilize a mounting bracket with fittings and connections to facilitate its placement beneath a piece of machinery. Replacement of the spent polymer-based media requires removing the device from its mounting bracket and then replacing it with a like device having a fresh supply of the polymer-based media.

The spill collection apparatus and spill containment device may be modified to provide a reusable housing that may be opened to access the polymer-based media. Spent polymer-based media may be replaced with a fresh supply of the media, and the housing may be re-installed in the bracket beneath the equipment.

A spill collection apparatus may be utilized to accumulate spilled and leaked hydrocarbons. Collected hydrocarbons may then be directed to flow into a spill containment device where they may be absorbed and solidified by the polymer-based media. A spill containment device may be modified to allow it to be removed from a spill collection apparatus and provide access to an array of the polymer-based media arranged within a reusable housing. Spent polymer-based media may be extracted from the reusable spill containment device housing and replaced with a fresh amount of the polymer-based media having a capacity to sorb and solidify hydrocarbon contaminants. The reusable housing of the spill containment device containing a fresh supply of media may then be reconnected to the spill collection apparatus.

A disposable spill containment device housing containing a polymer-based media may be used a similar manner with a spill collection apparatus.

In each instance, once the polymer-based media has reached its capacity to sorb and solidify contaminants, the method and apparatus of the instant invention provide a means of easy retrieval of consolidated contaminants for disposal or recycling options. As such, the solidified mass eliminates storage and mass transfer concerns associated with existing methods of dealing with free-flowing hydrocarbons, substantially reducing the capital costs and operating expenses of dealing with these types of pollutants. Solidified hydrocarbons will not leach when exposed to pressures used to determine landfill acceptability. They also provide a high BTU value when incinerated.

Certain configurations of a spill containment device, its internal components and the spent polymer-based media may have the capability of being granulated to a desired screen size and utilized as a component in the production of asphalt, roofing material or other tar-like compounds or incinerated as fuel.

Elastomer polymers may be utilized to provide a variety of polymer-based media embodiments. The polymer may packaged in its granular or bead-like form, blended with absorbing, adsorbing or coalescing materials or suspended within the fibers of a textile material to provide a solidifying fabric. An agglomeration of the polymer and binding agents may be formed into disks or rings.

Elastomer polymers have proven to be highly effective in absorbing and solidifying hydrocarbon contaminants in controlled environments. However, a number of deficiencies are readily apparent when they are used in the field. A volume of the loose polymer material may not be effectively utilized in the spill collection apparatus of the present invention due to it being easily carried by air flowing beneath a moving vehicle and allowing the polymer to be blown out of the collection apparatus. Thus, the polymer material is best utilized when packaged.

However, when elastomer polymers are packaged in a conventional tube or boom-like configuration, a layer of solidified hydrocarbons typically forms just beneath the outer envelope layer of such a device. The resultant layer of surface blockage effectively seals the remaining polymer within the device, preventing any polymer beneath the solidified layer of surface blockage from being further utilized to solidify contaminants.

Similar surface blockage problems occur when attempting to utilize granular elastomer polymer material within a filtration container as a hydrocarbon extracting filtration media. In U.S. Pat. No. 4,534,865, Sundberg teaches that when utilizing a cross-linked organic polymer as a filtration media, the flow of a feed stream through an absorption bed of polymer will be decreased, and ultimately terminated, by the swelling of the polymer material as it absorbs and retains contaminants passing through a container of cross-linked polymer.

Random placement of individual polymer-filled bags within a spill containment device may result in the restricted flow of collected contaminants into the device due to the polymer-filled bags demonstrating an effect similar to that created by the use of sandbags as flood control devices. Loose polymer within a textile material envelope may shift and settle into cavities between surrounding polymer-filled bags, restricting the flow of the collected hydrocarbons into the spill containment device. As hydrocarbons enter a spill containment device filled with individual polymer-filled bags, a barrier of solidified hydrocarbons may form at the inlet of the device and impede the flow of additional hydrocarbons into the device.

It has been discovered that by arranging alternating layers of measured amounts of solidifying polymer and layers of non-woven textile material, surface blockage may be overcome. The properties of the textile material that allow for absorption and migration of all viscosities of liquid hydrocarbons effectively provides maximum surface area exposure of the polymer to the collected hydrocarbons. The stratification design allows for optimum efficiency in utilizing the solidifying properties of the polymer. The extremely rapid reaction between light viscosity hydrocarbons and the polymer could otherwise result in a volume of loose polymer placed within a conventional sorbent pillow being surrounded by a non-permeable rubber shell. The resulting surface blockage would thereby prevent the polymer sealed within the rubber shell from being used to solidify hydrocarbons.

Stratification promotes migration of light viscosity liquid hydrocarbons throughout the alternate layers of textile material where they are exposed to no more polymer than can be fully utilized for absorption and solidification. In addition, the stratification design allows heavier viscosity hydrocarbons to migrate throughout the layers of textile material and remain suspended within the stacked arrangement until they may be absorbed and solidified by the polymer.

The polymer may be suspended within the fibers of a textile material by incorporating the polymer into the body of the fabric as the textile material is formed. This process is normally used in the production of melt-blown or spun-bonded textiles. The manufacturing of a synthetic textile material starts with raw petro-chemical based pellets, such as polypropylene, being blended with pigments and/or additives. This mixture is heated to the melting point of the pellets and extruded into filaments. The filaments are drawn and attenuated, using high velocity air to align the polymer molecules of the fabric and maximize fiber strength. The resulting continuous, high tenacity filaments are formed into a web on a moving conveyor screen and thermally fused with a bonding system to maximize the strength and surface stability of the fabric.

The polymer may be suspended within the textile material by adding it to the mix of raw petrochemical based pellets, pigments and additives, melting the mixture and extruding filaments from the mixture. This method incorporates the polymer into the body of the filaments as they are formed.

Certain re-cycled plastics may be mixed with the pellets, pigments and additives used in the formation of the filaments of the textile material, eliminating them from landfills and utilizing the re-cycled components in an effective pollution control process.

The solidifying polymer may be suspended within the fabric by injecting a preferably evenly distributed amount of the polymer at an intermediate point on a web of filaments as they are formed on a conveyor screen. As the filaments are thermally fused by the bonding system, the polymer may be trapped within the layers of fused filaments, becoming a component of the finished textile fabric material.

The polymer may be suspended within pockets of a fabric by consolidating layers of textile material around measured amounts of polymer with a device having the capability of producing a pattern in the fused layers of textile material. A calendaring device is one example of an apparatus that may be utilized as a bonding mechanism; other means of consolidating the layers may be utilized. A pattern of preferably evenly distributed amounts of polymer may be placed on a layer of textile material filaments in a pattern corresponding to the pattern of the calendaring device. A second layer of textile material filaments may then be placed over the initial web of filaments supporting the pattern of evenly distributed amounts of polymer, prior to introducing the layers of textile material to the calendaring device. As the filaments of the two layers of textile material are fused by the calendaring device, the pattern of evenly distributed amounts of polymer may be encased within the pockets created by the bonding device. Thus, the resulting chambers of solidifying polymer become a component of the finished solidifying fabric.

It may be beneficial to include a plurality of quilting seams to further consolidate the stratified layers of solidifying fabric. Quilting seams, if included, tend to enhance ability of the textile material portion of the stratified arrangement to dispersively conduct contaminants under capillary attraction throughout the plurality of layers of solidifying fabric.

An agglomeration of polymer and binding agents may provide a polymer-based media. A mixture of polymer and binding agents may be heated to its melting point, poured into a mold and then placed in an oven. The thickness of a mold for a polymer-based agglomeration device may be limited to that which will successfully overcome the issue of surface blockage and allow total utilization of the polymer portion of the agglomeration.

Prior to placing the mold in an oven, the top of the mold is covered with a weighted device that serves to maintain a slight amount of pressure on the fluid agglomeration mixture within the mold. As the agglomeration mixture bakes, the weighted device assists in maintaining the uniform alignment of the components of the fluid agglomeration mixture within the mold as they are thermally fused. The polymer-based agglomeration may be molded into disks, rings or other suitable configurations.

Solidifying polymer may be blended with absorbent, adsorbent or coalescing materials, such as polyethylene pellets or polypropylene, to provide a polymer-based media.

Polymer-based agglomeration disks or a blend of solidifying polymer and absorbent, adsorbent or coalescing materials may be placed between layers of solidifying fabric to provide a polymer-based media. The textile material portion of the solidifying fabric may be utilized to dispersively conduct contaminants under capillary attraction throughout the plurality of layers of polymer-based media.

As used herein, examples of a hydrocarbon solidifying media wherein at least one component is an elastomer polymer having a property of imbibing and solidifying contaminants that come in contact with the media may be considered a polymer-based media.

A similar stratification concept to the one successfully demonstrated to effectively overcome the issue of surface blockage in polymer-filled bags may be employed to provide a variety of embodiments of a polymer-based media for solidifying hydrocarbons retained within a spill containment device.

Polymer-based media may be arranged within a spill containment device to establish flow channels and expansion chambers. One such arrangement may result in a substantially coplanar array of the polymer-based media establishing distinct chambers of hydrocarbon absorbing and solidifying units. The polymer-based media may be placed within a spill containment device in a uniform stratified arrangement to define a plurality of layers of the media having a substantially equal surface area and creating a plurality of flow channels of substantially equal cross-sectional area.

Flow channels established throughout a uniformly stratified coplanar array of the polymer-based media allow collected hydrocarbons to flow into a spill containment device without the previously encountered problems of flow restriction and surface blockage. It may be beneficial to include coalescing materials within a uniformly stratified array of polymer-based media to promote migration of collected hydrocarbons throughout a spill containment device. Other uniform arrangements of a polymer-based media that allow collected hydrocarbons to flow into a spill containment device without restriction and surface blockage, including combining the elastomer polymer material with coalescing or other materials, may be utilized to provide a polymer-based media.

The solidifying fabric may provide a variety of embodiments of a polymer-based media. In one configuration, a plurality of layers of the solidifying fabric may be arranged within a spill containment device in a parallel orientation to the direction of the flow of the collected contaminants into the device. Layers of solidifying fabric may be arranged to conform to the internal geometric configuration and dimensions of a spill containment device so that each successive internal layer of solidifying fabric may be circumscribed by an adjacent outer layer of the fabric. When viewed from one end of a cylindrically shaped containment device, the arrangement of solidifying fabric may appear as a series of concentric circles.

It may be beneficial to include layers of coalescing material between the layers of solidifying fabric. For example, a length of solidifying fabric may be covered by a corresponding length of coalescing material, such as a lattice-like arrangement of polyethylene, and rolled into a cylindrical shape. The resulting spiral arrangement of alternate layers of coalescing mesh material and solidifying fabric, similar to the previously disclosed arrangement of layers of solidifying fabric with each successive layer circumscribing an adjacent inner layer, serves to provide maximum surface area contact of the collected contaminants with the solidifying fabric, establish flow channels and allow for expansion of the polymer-based media.

To provide increased surface area, solidifying fabric may be folded and arranged in an accordion-like configuration. The pleated solidifying fabric may be arranged to conform to the internal geometric configuration and dimensions of a spill containment device. A plurality of layers of the solidifying fabric may be arranged within a spill containment device to conform to the internal dimensions of the device and provide a polymer-based media.

As used herein, an arrangement of solidifying fabric that provides for migration of contaminants under capillary attraction throughout layers of solidifying fabric, establishes flow channels that inhibit formation of a layer of surface blockage or allows for the expansion of the polymer-based media may be considered to be a nested array of solidifying fabric.

A spill containment device may utilize a polymer-based media, such as solidifying fabric or polymer-based agglomeration disks, to absorb and solidify collected hydrocarbons. In instances where a plurality of layers of the polymer-based media may be utilized, a coalescing material, such as a lattice-like arrangement of polyethylene, may be placed between the layers of the polymer-based media to promote migration of accumulated hydrocarbons and allow for expansion of the polymer-based media.

Various embodiments of a polymer-based media may be placed in a spill containment device to utilize the stratification concept successfully demonstrated to effectively overcome the issue of surface blockage. Stratification of the polymer-based media within a spill containment device may establish flow channels and expansion chambers, provide maximum surface area contact of the solidifying polymer portion of the media with the collected hydrocarbons and allow the entire amount of the polymer within the device to be utilized.

Layers of coalescing material and open-spaced expansion chambers may provide reservoirs within the spill containment device to retain collected hydrocarbons until they can be sorbed and solidified by the polymer-based media. Further, open-spaced expansion chambers, and some forms of coalescing layers, allow the polymer-based media to expand and increase in volume as it imbibes and solidifies contaminants coming into contact with it.

Stratification may be achieved by utilizing layers of certain types of coalescing material and open-spaced chambers between layers of the polymer-based media. Coalescing layers may be provided by a wide range of materials. One example may be an open textured, non-woven pad formed with synthetic fibers, such as nylon and polyester. Such pads tend to compress when the polymer-based media expands as it imbibes hydrocarbons.

Each layer of a polymer-based media may establish a distinct chamber for absorbing and solidifying contaminants and afford collected contaminants that are directed to a spill containment device with a multiplicity of contact points with the polymer. Stratified layers that establish flow channels further serve to thwart surface blockage within a spill containment device.

Stratification of the polymer-based media, coalescing materials and open-spaced expansion chambers may provide for a uniform distribution of the solidifying polymer for maximum surface contact with contaminants directed into a spill containment device. Uniform distribution of the solidifying polymer further provides for the uniform expansion of the solidifying polymer as it imbibes and solidifies contaminants.

BRIEF DESCRIPTION OF THE DRAWINGS

The accompanying drawings illustrate the preferred embodiments of the invention in which.

DESCRIPTION OF THE PREFERRED EMBODIMENT

The present method and apparatus provide for the removal of hydrocarbon spills and leaks by accumulating them with a spill collection apparatus and directing them to a spill containment device where the hydrocarbons may be retained for absorption and solidification by a polymer-based media. A spill containment device may be comprised of a disposable housing having a supply of a polymer-based media, or the device may provide for spent polymer-based media to be replaced within a reusable housing. The surface beneath an engine, transmission or fuel tank of a motor vehicle, marine vessel or other piece of mobile equipment may be kept free from hydrocarbon pollutants with no regard to whether the equipment is stationary or in motion on a highway, street, or ocean.

Collected hydrocarbon contaminants may be directed to a spill containment device where they may be exposed to a polymer-based media. The polymer-based media may be configured to prevent surface blockage, allowing the entire amount of hydrocarbon solidifying polymer within the spill containment device to reach its capacity for contaminant uptake.

The method and apparatus may best be used to solidify hydrocarbon contaminants collected beneath internal combustion engines, transmissions and fuel tanks. Composition of the hydrocarbons, quantity of the hydrocarbons that may be spilled or leaked and length of time the collected hydrocarbons are exposed to the solidifying polymer, along with ambient temperature and configuration of components utilized in the method and apparatus, are critical factors in determining the rate of absorption and the amount of time required to solidify the broad spectrum of hydrocarbon spills and leaks the present method is designed to collect and contain.

To enhance the interaction of the solidifying polymer with the collected hydrocarbons, the present method and apparatus may utilize the layering of a hydrocarbon solidifying polymer-based media. Coalescing material and open-spaced expansion chambers may be utilized to form various embodiments of a stratified arrangement of a polymer-based media within a spill containment device.

Monitoring of a spill containment device may be desired to confirm the media within the device is capable of accepting and solidifying additional amounts of collected hydrocarbon contaminants. In the event the polymer-based media has reached its capacity for hydrocarbon uptake, it may be replaced with a fresh supply of polymer-based media.

Figure 1:
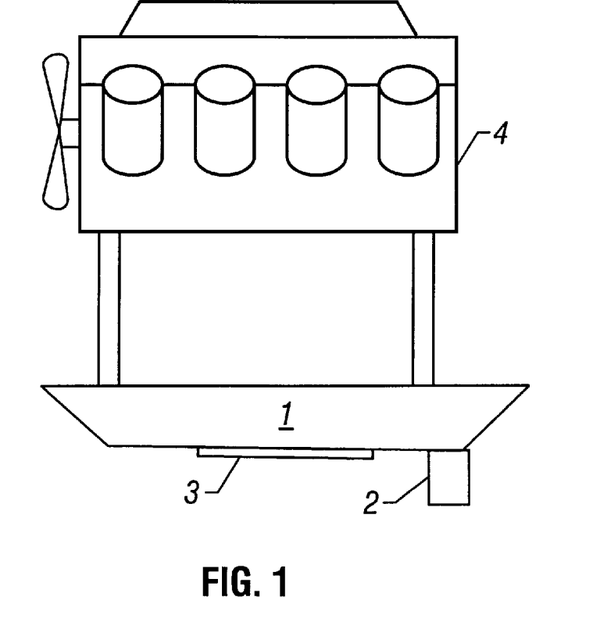
FIG. 1 is an illustration of spill containment devices and a spill collection apparatus mounted beneath a piece of equipment.

FIG. 1 is an illustration of a spill collection apparatus 1 and spill containment devices 2 and 3 mounted beneath a piece of equipment 4 utilizing a hydrocarbon fueled or lubricated internal combustion engine to provide power. The shape and form of spill collection apparatus 1 may be contoured to direct collected hydrocarbon spills and leaks accumulated from equipment 4 to spill containment device 2 or spill containment device 3.

Spill containment device 2 is depicted as a cylindrical housing that may be utilized to retain hydrocarbon spills and leaks accumulated by spill collection apparatus 1. Hydrocarbon spills and leaks of equipment 4 that may fall into spill collection apparatus 1 may be funneled to spill containment device 2 for absorption and solidification by the polymer-based media within the housing of the spill containment device.

Spill containment device 3 is depicted as a low-profile box that provides a large surface area exposure of the polymer-based media within the spill containment device to hydrocarbon spills and leaks. This type of spill containment device may be preferred in instances where ground clearance and an unobstructed appearance below the equipment may be desired. The aperture of spill collection apparatus 1 may be sized to allow for maximum surface area exposure of the polymer based media carried within spill containment device 3 to hydrocarbon spills and leaks. The hydrocarbon spills and leaks of equipment 4 may fall into spill collection apparatus 1 and be funneled to spill containment device 3 for absorption and solidification, or in some instances, the hydrocarbon spills may fall directly onto the spill containment device.

In each instance, hydrocarbon spills and leaks accumulated within spill collection apparatus 1 may be funneled to a spill containment device comprising a housing containing a supply of a polymer-based media having the property of absorbing and solidifying hydrocarbons coming into contact therewith.

Figure 1A:
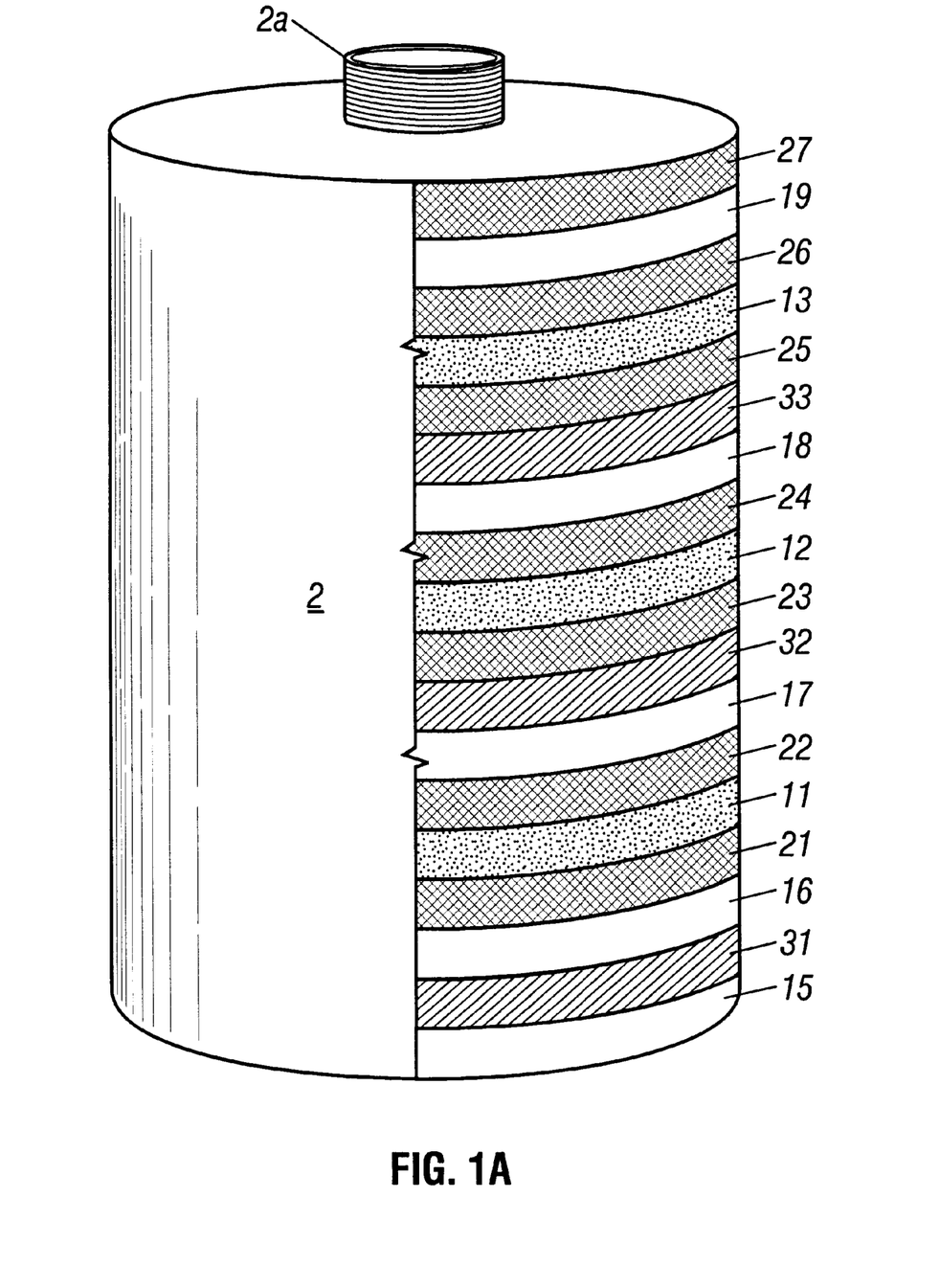
FIG. 1A shows a cross section of a stratified arrangement of polymer-based media within a spill containment device.

FIG. 1a is a cross-sectional view of a device that provides for the containment of collected hydrocarbon spills and leaks. Within spill containment device 2 is a stratified arrangement of polymer-based media 11, 12 and 13, coalescing material 21, 22, 23, 24, 25, 26 and 27 and open-spaced expansion chambers 15, 16, 17, 18 and 19. Collected hydrocarbons may be directed to enter spill containment device 2 at port 2a via a connection to the spill collection apparatus. Hydrocarbons may then flow throughout the spill containment device and come in contact with layers of the polymer-based media.

The placement of a layer of polymer-based media 12 between coalescing layers 23 and 24 creates a series of continuous consolidation points along the planes where the distinct layers intersect. This stratified arrangement presents hydrocarbons with a significant amount of surface area exposure to the evenly distributed polymer-based media as they flow into the spill containment device. Contaminants are provided numerous contact points with the solidifying polymer for absorption and solidification. Coalescing layers and open-spaced expansion chambers allow for the expansion of the polymer-based media as it sorbs and solidifies hydrocarbons.

Structural stabilizing segments 31, 32 and 33 may be utilized in the stratified arrangement to assist in maintaining the alignment of the stratified layers within a spill containment device by arranging them in a substantially perpendicular orientation to the direction of flow of hydrocarbons into the device. The segments may be sized to conform to the internal dimensions of a spill containment device and may be made of a material similar to that comprising the housing of the device. A pattern of perforations may be incorporated in each structural stabilizing segment to allow collected hydrocarbons to flow through the spill containment device with limited restriction.

Utilization of structural stabilizing segments provides for an even distribution and equitable surface area exposure of the collected hydrocarbons to the polymer-based media. These segments may also serve to maintain the alignment of the stratified layers during shipping and handling. Consistent alignment of the stratified layers within a spill containment device provides for the uniform expansion of the solidifying polymer as it imbibes and solidifies contaminants. Uniform expansion of the solidifying polymer supports full utilization of the polymer-based media.

It may be beneficial to seal the cavity between a structural stabilizing segment and the internal wall of a spill containment device with a gasket or other means. Sealing the cavity between a structural stabilizing segment and the internal wall of a spill containment device may prevent migration of hydrocarbons along the internal wall of the device and allow them to leak out of the device and on to the surface beneath it.

Polymer-based gaskets may be formed with an agglomeration of solidifying polymer and binding agents, solidifying fabric or other polymer-based devices. Other types of gaskets may be used.

Figure 2:
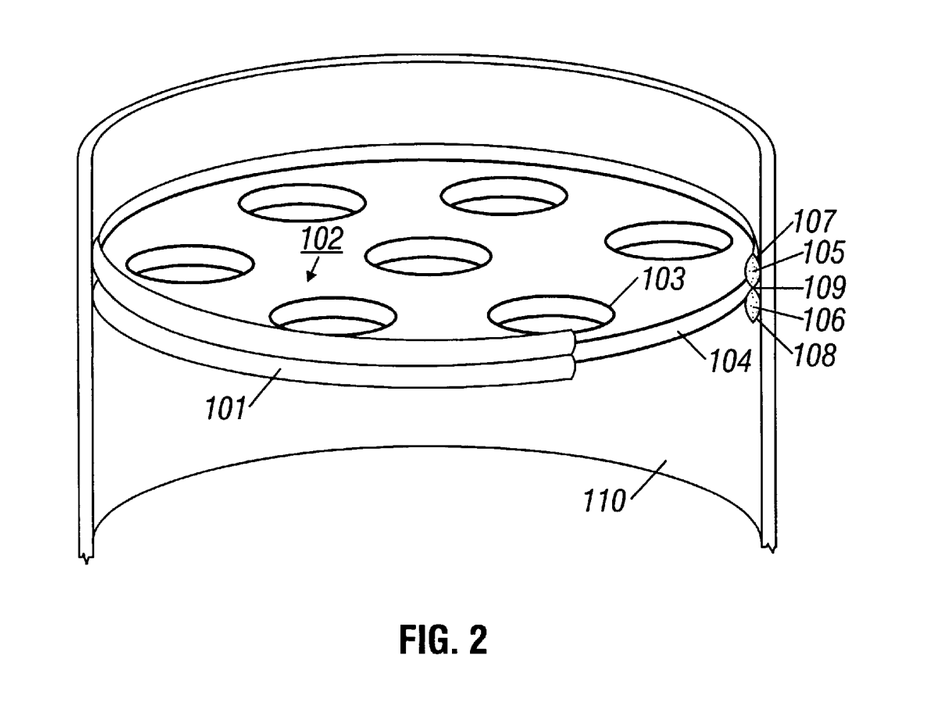
FIG. 2 shows a polymer-filled gasket aligned between a structural stabilizing segment and the internal wall of a spill containment device.

One example of such a gasket may be comprised of distinct chambers of solidifying polymer within tubular columns of textile material. As shown in FIG. 2, polymer-filled tubular columns may be aligned in substantial registration with each other and joined along their peripheries to form gasket 101. The polymer-filled gasket may be aligned with structural stabilizing segment 102 so that the outer edge of the structural stabilizing segment 104 abuts the stratified tubular columns of solidifying polymer 107 and 108 along the seam 109 that consolidates the tubular columns.

When a structural stabilizing segment circumscribed by a polymer-filled gasket is placed within a spill containment device, the polymer-filled columns of the gasket seal the cavity between the inner wall of the device 110 and the outer edge of the structural stabilizing segment 104. The flow of collected hydrocarbons through a spill containment device may then be directed to the pattern of perforations 103 in the structural stabilizing segment for an even distribution and equitable surface area exposure of the collected hydrocarbons to a subsequent layer of the polymer-based media.

As contaminants come in contact with the gasket, the distinct chambers of polymer 105 and 106 may expand as they imbibe and solidify pollutants. Expansion of the polymer may allow the gasket to further conform to variations in the space between the inner wall of the spill containment device and the structural stabilizing segment, thereby improving the effectiveness of the seal between the two surfaces. Such gaskets may further serve to define the outer periphery of an open-spaced expansion chamber on either side of a structural stabilizing segment and assist in maintaining the alignment of the adjacent stratified layers of the polymer-based media.

Figure 3:
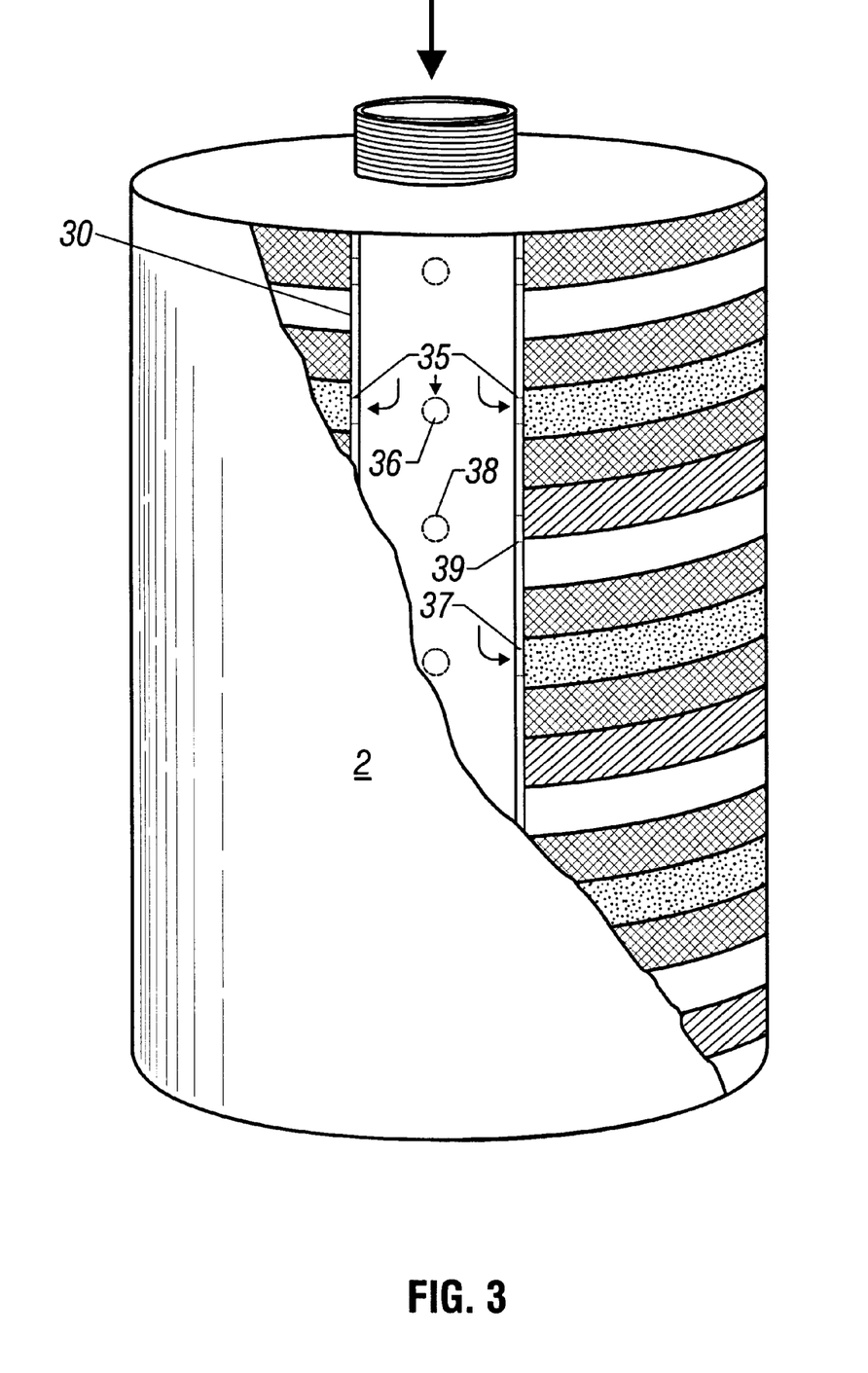
FIG. 3 shows a cross section of a stratified arrangement of polymer-based media within a containment device circumscribing a tubular internal structural stabilizing column.

Additional modification to the stratified design may prove to be advantageous in augmenting the structural stability of a spill containment device. In FIG. 3, a cross-sectional view of an apparatus for containing hydrocarbon contaminants shows a stratified arrangement of polymer-based media, coalescing material and open-spaced expansion chambers circumscribing an internal column 30 that may be included for additional structural stability. In instances where the internal structural stabilizing column is of a tubular configuration it may contain a pattern of perforations 35, 36, 37, 38 and 39 that may be utilized as a conduit to direct collected hydrocarbons throughout a spill containment device for distribution of the hydrocarbons to the polymer-based media.

As shown in FIG. 3, collected hydrocarbons may be directed to pass through the internal tubular column, then directed to the stratified layers of polymer-based media via the series of perforation along the length of the tubular column.

Stratification of the polymer-based media results in distinct hydrocarbon absorbing and solidifying units within a spill containment device. It also provides maximum surface area contact of collected hydrocarbons to the polymer-based media and allows greater exposure of the accumulated hydrocarbons to the solidifying polymer for absorption and solidification.

Figure 4:
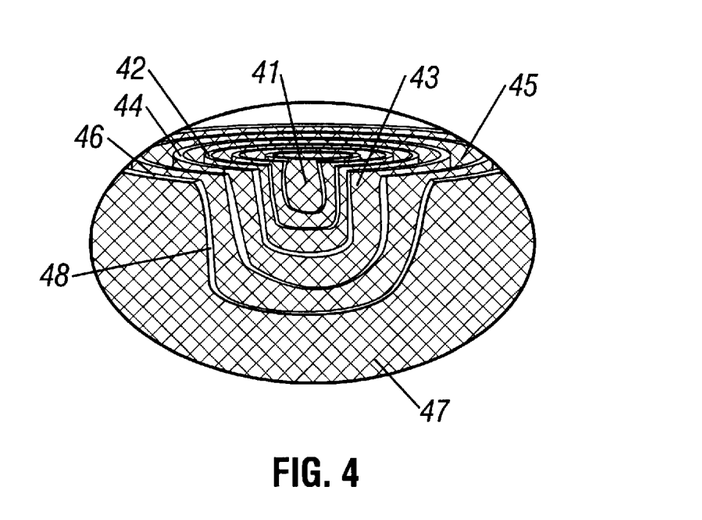
FIG. 4 shows a nested array of solidifying fabric and coalescing material that may provide a polymer-based media.

FIG. 4 is an illustration of a polymer-based media comprising a nested array of solidifying fabric 42, 44 and 48 arranged to form of a polymer-based media. Layers of lattice-like coalescing mesh material 41 and 47 may be placed between each layer of solidifying fabric in the nested array. The resulting arrangement of alternate layers of coalescing mesh material and hydrocarbon solidifying fabric provides maximum surface area contact of hydrocarbon contaminants with the polymer-based media, establishes flow channels 43, 45 and 46 between the layers of solidifying fabric and allows for the expansion of the polymer-based media.

As hydrocarbons come in contact with the textile material portion of the solidifying fabric, the web of non-woven textile filaments may dispersively conduct contaminants via capillary attraction throughout the nested array of solidifying fabric for absorption and solidification by the polymer portion of the fabric.

Figure 4A:
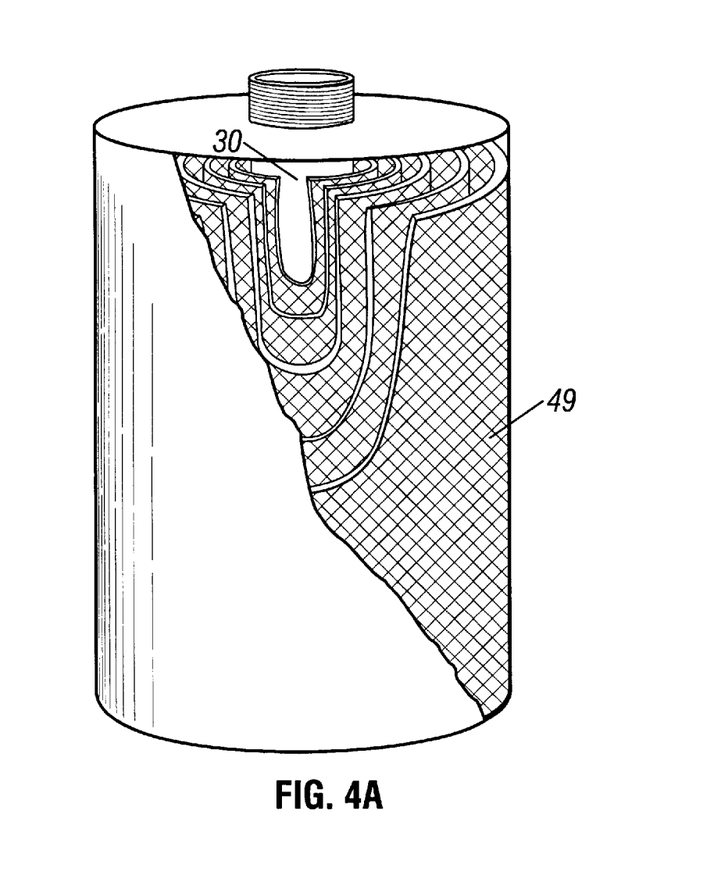
FIG. 4A shows a nested array of solidifying fabric circumscribing a tubular internal structural stabilizing column.

As shown in FIG. 4A, the nested array of solidifying fabric 49 may be modified so that the layers of solidifying fabric may circumscribe an internal tubular column 30.

Stratification of solidifying fabric within a spill containment device may allow for optimum efficiency in utilizing the solidifying properties of the polymer by promoting the migration of hydrocarbons throughout the interior of the device.

Other arrangements of solidifying fabric that provide for the migration of contaminants under capillary attraction throughout a nested array of solidifying fabric, establish flow channels that inhibit the formation of a layer of surface blockage while collected hydrocarbons to flow through the spill containment device or allow for the expansion of the polymer-based media may be utilized.

In accordance with the first embodiment of the present invention directed to a method and apparatus for collecting and containing the hydrocarbon spills and leaks, a layer of solidifying fabric measuring approximately 18"×18" may be comprised of 68 grams by weight of the solidifying polymer and 28 grams by weight of a textile material, preferably a petrochemical based fabric such as polypropylene having a density of 2 ounces per square yard. The polymer material is preferably an elastomer polymer sold under the trademark WASTE-SET 3200, WASTE-SET 3400, NOCHAR A610, NOCHAR A650, ENVIRO-BOND 403, NORSOREX APX1, H-100 ENVIRONMENTAL SPILL ENCAPSULANT, IMBIBER BEADS or an equivalent. A solidifying fabric sold under the trademark LAMINIT, or an equivalent, may be utilized.

Figure 5:
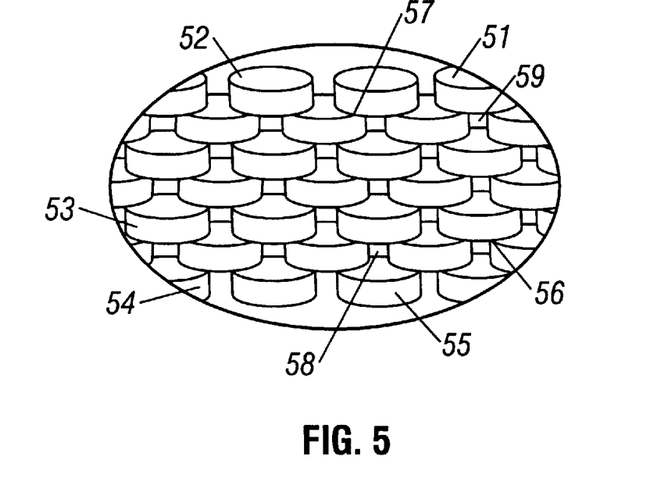
FIG. 5 shows a plurality of polymer-based agglomeration disks arranged in a substantially coplanar array to provide a polymer-based media.

As shown in FIG. 5, a plurality of polymer-based devices 51, 52, 53, 54 and 55 may be placed in a substantially coplanar arrangement to provide a polymer-based media within a spill containment device. Each polymer-based device may be comprised of an agglomeration of solidifying polymer and binding agents that may be formed into a disk. The coplanar arrangement creates a series of consolidation points of substantially equal surface area 56 and 57 throughout the stratified layers of polymer-based agglomeration disks and creates a series of flow channels of substantially equal cross-sectional area 58 and 59. These flow channels, located in areas where the disks do not come in contact with each other, allow collected hydrocarbons to flow into the spill containment device by inhibiting the formation of a layer of surface blockage.

As a polymer-based agglomeration disk imbibes and solidifies hydrocarbons, it tends to expand at a considerably greater rate along its horizontal plane than its vertical plane. This is due, in part, to the compression of the agglomeration as it is thermally fused. Coalescing materials may be placed between polymer-based agglomeration disks to provide flow channels for accumulated hydrocarbons within a spill containment device and assist in maintain the alignment of the polymer-based media as it expands while imbibing and solidifying collected contaminants.

A significant amount of surface area exposure may be provided for the polymer-based agglomeration disks to the collected hydrocarbons as they flow into a spill containment device. Contaminants coming in contact with the agglomeration disks may be dispersively conducted via capillary attraction throughout the interior of the disks for absorption and solidification. Consolidation points 56 and 57 of the agglomeration disks further provide for the migration of contaminants under capillary attraction throughout the arrangement of disks.

Modifying a polymer-based agglomeration disk to form a ring or doughnut provides a significant increase in surface area exposure of the polymer-based agglomeration to collected hydrocarbons. A spill containment device may be configured to utilize a plurality of polymer-based agglomeration rings stacked along the length of the tubular internal column of FIG. 3 so that the tubular column may serve as a conduit to distribute collected hydrocarbons throughout the device. Sufficient space may be required between the outer periphery of the polymer-based agglomeration rings stacked along the internal tubular column and the internal wall of the spill containment device to allow for the expansion of the polymer-based media as it absorbs and solidifies hydrocarbons. Thus, rather than the previously disclosed arrangement of open-spaced expansion chambers being located between layers of a polymer-based media, an open-spaced expansion chamber between the periphery of the stratified layers of the polymer-based agglomeration rings and the inner wall of the spill containment device may be employed.

Figure 6:
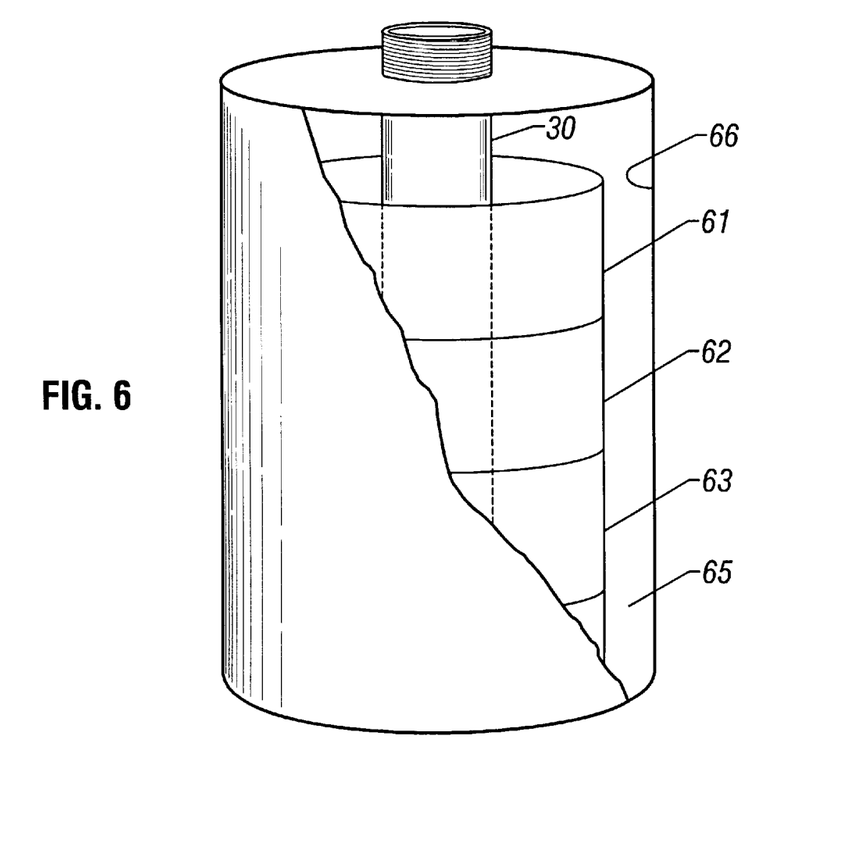
FIG. 6 shows a plurality of polymer-based agglomeration rings arranged to circumscribe a tubular internal structural stabilizing column.

As shown in FIG. 6, polymer-based agglomeration rings 61, 62, and 63 may be arranged within a spill containment device so that the aperture at the center of each polymer-based agglomeration ring may circumscribe an internal tubular column 30. Open-spaced expansion chamber 65 between the stratified polymer-based agglomeration rings and the inner wall of the spill containment device 66 allows for the expansion of the polymer-based media as it imbibes and solidifies hydrocarbons.

Other configurations and arrangements of a polymer-based agglomeration media that provide consolidation points for migration of contaminants under capillary attraction throughout an arrangement, allow for expansion of the media or establish flow channels that permit collected hydrocarbons to flow through an array of polymer-based agglomeration devices and inhibit the formation of a layer of surface blockage may be utilized.

In accordance with the second embodiment of the present invention directed to a method and apparatus for collecting and containing the hydrocarbon spills and leaks, the preferable blend of a hydrocarbon solidifying polymer and binding agents to provide a polymer-based agglomeration may be comprised of a mixture of 95% solidifying polymer and 5% binding agents. The polymer material is preferably an elastomer polymer sold under the trademark WASTE-SET 3200 or an equivalent.

Blending a hydrocarbon solidifying polymer with absorbing, adsorbing or coalescing materials may provide a polymer-based media having properties similar to that of a solidifying fabric or a polymer-based agglomeration. A polymer-based agglomeration may be granulated to a desired screen size and blended with absorbing, adsorbing or coalescing materials to provide a polymer-based media.

Figure 7:
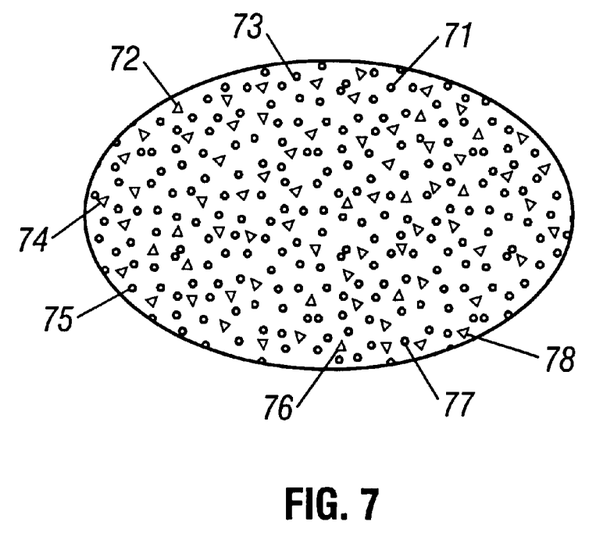
FIG. 7 shows a blend of the solidifying polymer and other material providing a polymer-based media.

As shown in FIG. 7, combining solidifying polymer 71, 73, 75 and 77 with non-solidifying materials 72, 74, 76 and 78 in a homogeneous blended mixture provides collected hydrocarbons contaminants with multiple contact points and extensive surface area exposure to the solidifying polymer. Non-solidifying components of the blended mixture may enhance the ability of the polymer-based media to achieve complete utilization of the hydrocarbon solidifying components of the polymer-based media.

Absorbing or adsorbing materials may dispersively conduct contaminants under capillary attraction throughout the media, and coalescing materials may provide flow channels throughout the media. In each instance, collected hydrocarbons may flow through the media for absorption and solidification by the polymer portion of the blended mixture.

The ratio of solidifying polymer to non-solidifying components may be such that the blended polymer-based media may serve to inhibit the formation of a layer of surface blockage as the solidifying polymer reaches its capacity for uptake of contaminants. A spill containment device may be configured to utilize an internal tubular column containing a pattern of perforations as a conduit to direct collected hydrocarbons throughout the device for an even distribution of the collected hydrocarbons to the polymer-based media.

In accordance with the third embodiment of the present invention directed to a method and apparatus for collecting and containing the hydrocarbon spills and leaks, the preferable blend of polymer and other types of materials to provide a polymer-based media may be comprised of a mixture of the solidifying polymer and an absorbing or adsorbing material, preferably polypropylene or a coalescing material, preferably polyethylene pellets. The polymer material is preferably an elastomer polymer sold under the trademark WASTE-SET 3200, WASTE-SET 3400, NOCHAR A610, NOCHAR A650, ENVIRO-BOND 403, NORSOREX APX1, H-100 ENVIRONMENTAL SPILL ENCAPSULANT, IMBIBER BEADS or an equivalent.

Various embodiments of a polymer-based media may be placed within a spill containment device to allow each component to be sized and configured to meet the requirements of a broad range of applications. Criteria utilized in producing a spill containment device may include the volume, composition and viscosity of the collected contaminants, the operating temperature of the equipment and the ambient temperature.

A combination of embodiments may be utilized to provide a polymer-based media. A variety of stratified arrangements may be utilized to achieve the desired results in specific applications. Identical embodiments of a polymer-based media may be utilized to form stratified layers within a spill containment device, or a variety of embodiments may be stacked within a device.

Figure 8:
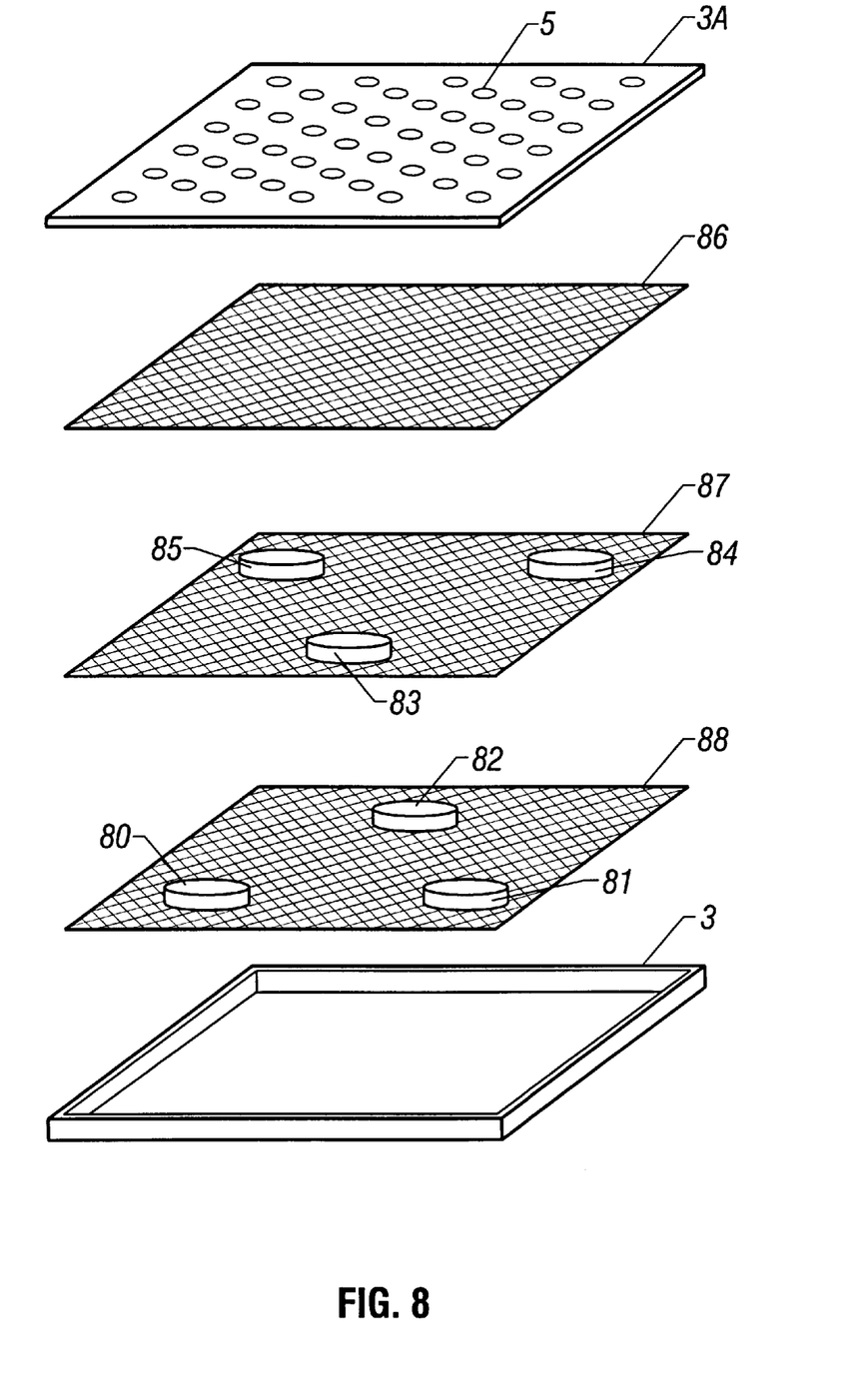
FIG. 8 is an exploded illustration of a spill containment device wherein alternate layers of solidifying fabric and polymer-based agglomeration disks provide a polymer-based media.

For example, FIG. 8 is an exploded illustration of a polymer-based media that may be utilized within a spill containment device 3. Polymer-based agglomeration disks 80, 81, 82, 83, 84 and 85 may be stratified between layers of solidifying fabric 86, 87 and 88 and arranged to conform to the dimensions of spill containment device 3. The stratified arrangement of polymer-based media may be enclosed within spill containment device 3 by a removable perforated lid 3a. Perforations 5 in the lid allow hydrocarbon spills and leaks directed to the spill containment device to enter the device for absorption and solidification by the polymer-based media.

The polymer-based agglomeration disks may be sized and placed within the arrangement to allow for their expansion as they imbibe and solidify hydrocarbon contaminants coming into the spill containment device. Hydrocarbons coming into contact with the textile material portion of the solidifying fabric may be dispersively conducted via the capillary attraction of the web of non-woven textile filaments throughout the stratified arrangement of solidifying fabric and polymer-based agglomeration disks for absorption and solidification by the polymer portion of the solidifying fabric and the agglomeration disks.

Other combinations and embodiments of a polymer-based media may be utilized within a spill containment device. For example, polymer-based agglomeration disks may be stratified between alternate layers of non-woven textile material within a spill containment device to provide a polymer-based media. Hydrocarbons coming into contact with the non-woven textile material may be dispersively conducted via the capillary attraction to the non-woven textile material and polymer-based agglomeration disks for absorption and solidification by the polymer portion of the agglomeration disks. Similarly, a blend of polymer and other absorbent materials may be placed within a non-woven textile material envelope to provide the media.

Figure 9:
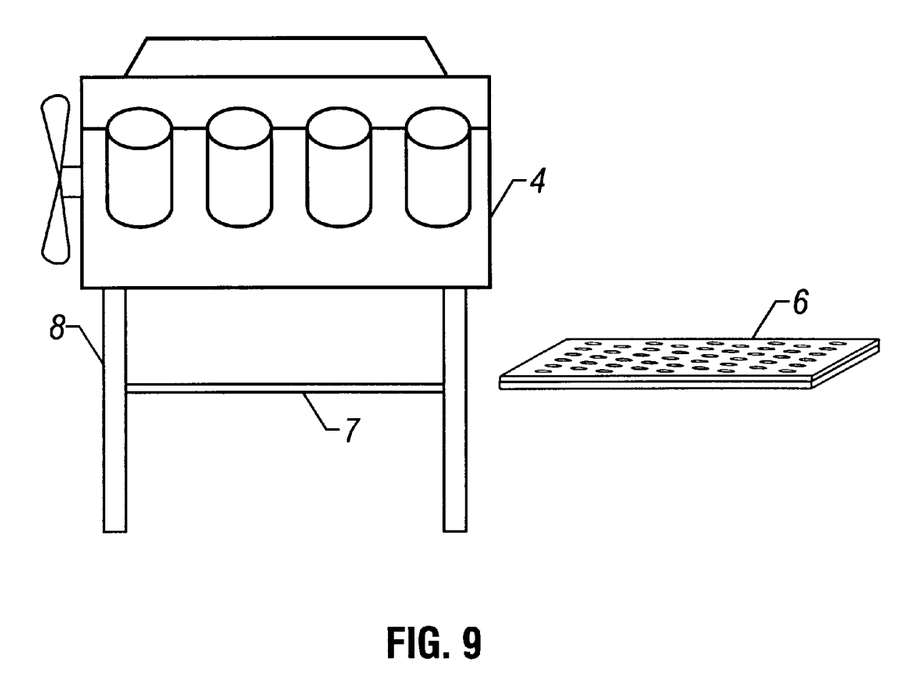
FIG. 9 is an illustration of a spill collection device mounted beneath a piece of equipment.

In certain instances, it may be beneficial to combine the spill collection apparatus and spill containment devices into a single spill collection device. FIG. 9 is an illustration of spill collection device 6 that may be positioned beneath a piece of equipment 4 to collect hydrocarbon spills and leaks. Mounting bracket 7 may be attached to the frame 8 of the equipment so that when spill collection device 6 is placed in the mounting bracket, the spill collection device may be positioned beneath the equipment to collect and contain hydrocarbon spills and leaks for absorption and solidification by a polymer based media contained within the device.

A spill collection device having a spent supply of the polymer-based media may be removed from the mounting bracket and replaced with a like device having a fresh supply of the polymer-based media. The device may be modified to provide a reuseable housing wherein a removable lid of the device may be opened to access the polymer-based media. Spent polymer-based media may be extracted from the housing of the device and replaced with a fresh supply of the media. The removable lid may then be replaced on the reusable housing containing the fresh supply of polymer-based media, and the housing may be re-installed in the mounting bracket attached to the frame of the vehicle and utilized to collect and solidify hydrocarbon spills and leaks.

It may be appreciated that a nested array of solidifying fabric where each successive internal layer may be circumscribed by an adjacent outer layer of fabric so that when viewed from one end of the arrangement it may appear as a series of concentric circles, or a spiral-like arrangement of solidifying fabric and an alternate layer of coalescing material, is a stratified arrangement of the solidifying fabric.

The size and shape of a spill collection device may be varied to meet specific application requirements. A spill containment device may be incorporated into the method as a reusable housing having the capability of accepting an amount of a polymer-based media, or it may be formed as a disposable device containing a polymer-based media.

Although the disclosed polymer-based media is preferred, other types of media may be substituted. For example, individual polymer-filled bags or polymer-filled devices as disclosed in U.S. Pat. Nos. 5,324,429, 5,458,773, 5,462,785, 5,518,797, 5,527,457 and 5,645,378 (all of which are hereby incorporated by reference as if fully set forth) may be utilized. Single-layer, non-stratified hydrocarbon solidifying pillows, pads, booms or blankets that utilize hydrocarbon solidifying imbiber beads may be used. Similarly, a blend of polymer and other absorbent, adsorbent or coalescing materials may be placed within a non-woven textile material envelope to provide the media. Further, sorbent devices comprised of non-woven, petro-chemical based textile material such as polypropylene may be substituted for the preferred polymer-based media.

Candidates for use of this method and apparatus include automobiles, trucks, tractors, generators, compressors, and other types of mobile equipment that may use an internal combustion engine as a source of power. Marine vessels, locomotives, pipeline pump stations, electric utility substations, offshore exploration and production platforms and automobile service stations and other fueling terminals may benefit from the utilization of the instant method and apparatus.

The present invention may be adapted for use as a method and apparatus to collect spills and leaks from hydrocarbon storage containers. A spill collection apparatus may be configured to accumulate spilled or leaked hydrocarbons from fuel or lubricant storage vessels and direct them to a spill containment device for solidification by a polymer-based media. Thus, the spill collection apparatus and the spill containment device prevent spilled or leaked hydrocarbons from contaminating the surface below the storage containers.

The foregoing description of the preferred embodiment has been for the purpose of explanation and illustration. It will be appreciated by those skilled in the art that modifications and changes may be made without departing from the essence and scope of the present invention. Therefore, it is contemplated that the appended claims will cover any modifications or embodiments which fall within the scope of the invention.

What is claimed is:

1. A method of collecting and containing hydrocarbon spills and leaks, comprising the steps of:
   providing a hydrocarbon spill collection apparatus adapted to accumulate and direct hydrocarbon spills and leaks to a hydrocarbon spill containment device;
   mounting the spill collection apparatus proximate but spaced apart from a source of a hydrocarbon spill or leak and in a fixed location thereto so as to be positioned to capture hydrocarbon spills and leaks from the source;
   said hydrocarbon spill containment device having hydrocarbon impermeable walls, a perforated lid, and a polymer-based media that includes an amount of a polymer material, said polymer material having a property of acting to absorb and solidify hydrocarbons coming into contact with the polymer-based media, the polymer-based media establishing a distinct chamber for hydrocarbon contaminant absorption and solidification;
   coupling said spill containment device beneath said spill collection apparatus so as to be in fluid communication therewith, whereby hydrocarbon spills and leaks collected by the collection apparatus are funneled to the spill containment device for absorption and solidification within said distinct chamber; and
   retaining the received hydrocarbon spills and leaks within the hydrocarbon spill containment device for solidification by the polymer-based media.

2. The method according to claim 1 further comprising the steps of:
   removing the hydrocarbon spill containment device having a spent supply of polymer-based media containing solidified hydrocarbons from the hydrocarbon spill collection apparatus;
   replacing the spent hydrocarbon spill containment device with a spill containment device having a fresh supply of the polymer-based media having a capacity to absorb and solidify hydrocarbons beneath said spill collection apparatus so as to be in fluid communication therewith; and
   disposing of the spent hydrocarbon spill containment device containing the solidified hydrocarbons.

3. A method according to claim 1 wherein the polymer material component of the polymer-based media is an elastomer polymer.

4. A method according to claim 1 wherein the polymer-based media is arranged within the spill containment device to create flow channels therethrough.

5. A method according to claim 1 wherein a volume of the polymer-based media is arranged within the spill containment device to allow for the expansion of the polymer as it imbibes and solidifies hydrocarbons.

6. A apparatus for collecting and containing hydrocarbon spills and leaks, comprising:
   a hydrocarbon spill collection apparatus to collect hydrocarbon spills and leaks;
   a hydrocarbon spill containment device having hydrocarbon impermeable walls and a perforated lid; and
   a polymer-based media disposed in the spill containment device that includes a volume of a polymer material, said polymer-based media arranged to establish a distinct chamber for hydrocarbon contaminant absorption and solidification, the polymer material of said polymer-based media having a property of acting to absorb and solidify hydrocarbon coming into contact therewith;
   said spill containment device being mounted beneath said spill collection apparatus so as to be in fluid communication therewith, whereby hydrocarbon spills and leaks collected by the collection apparatus are funneled to the spill containment device for absorption and solidification within said distinct member.

7. The apparatus of claim 6 wherein the polymer-based media is a hydrocarbon solidifying fabric having a property of absorbing and solidifying hydrocarbons.

8. The apparatus of claim 7 wherein the hydrocarbon solidifying fabric is arranged in a nested array to establish flow channels therethrough and allow for the expansion of the media as it absorbs and solidifies hydrocarbons.

9. The apparatus of claim 7 wherein the hydrocarbon solidifying fabric is arranged to promote migration of hydrocarbons under capillary attraction throughout the solidifying fabric.

10. The apparatus of claim 6 wherein the polymer-based media comprises an agglomeration of polymer material and binding agents formed into disks.

11. The apparatus of claim 10 wherein the polymer-based agglomeration disks are arranged within the spill containment device to establish flow channels therethrough and allow for the expansion of the media as it absorbs and solidifies hydrocarbons.

12. The apparatus of claim 6 wherein the polymer-based media comprises of a blend of the polymer material and absorbent materials.

13. The apparatus of claim 12 wherein the polymer-based media is arranged within the spill containment device to establish flow channels therethrough and allow for the expansion of the media as it absorbs and solidifies hydrocarbons.

14. The apparatus of claim 6 wherein the polymer-based media comprises of a blend of the polymer material and adsorbent materials.

15. The apparatus of claim 14 wherein the polymer-based media is arranged within the spill containment device to establish flow channels therethrough and allow for the expansion of the media as it absorbs and solidifies hydrocarbons.

16. The apparatus of claim 6 wherein the polymer-based media comprises of a blend of the polymer material and coalescing materials.

17. The apparatus of claim 16 wherein the polymer-based media is arranged within the spill containment device to establish flow channels therethrough and allow for the expansion of the media as it absorbs and solidifies hydrocarbons.

18. The apparatus of claim 6 wherein the polymer-based media comprises stratified layers of a hydrocarbon solidifying fabric and polymer-based agglomeration disks.

19. The apparatus of claim 18 wherein the solidifying fabric is arranged to promote migration of hydrocarbons under capillary attraction throughout the stratified layers of polymer-based agglomeration disks and solidifying fabric.

20. The apparatus of claim 6 further comprising a plurality of layers of coalescing material within said spill containment device and wherein a volume of polymer-based media is arranged within the spill containment device in a stratified array between the layers of coalescing material.

21. The apparatus of claim 20 wherein said spill containment device has at least one open-spaced expansion chamber and wherein a layer of coalescing material is disposed adjacent said open-spaced expansion chamber.

22. The apparatus of claim 6 further comprising a structural stabilizing segment disposed within the spill containment device to maintain alignment of the polymer-based media within the spill containment device.

23. The apparatus of claim 22 wherein said structural stabilizing segment contains a pattern of perforations to allow hydrocarbons to flow throughout the spill containment device and direct the hydrocarbons to the polymer-based media.

24. The apparatus of claim 6 further comprising a structural stabilizing column disposed within the spill containment device wherein said structural stabilizing column is a perforated tube allowing hydrocarbons to flow throughout the spill containment device.

25. The apparatus of claim 24 wherein the perforated tubular structural stabilizing column is circumscribed by a polymer-based agglomeration ring.

26. The apparatus of claim 25 wherein an open-spaced chamber is provided between the polymer-based agglomeration ring and the hydrocarbon impermeable walls of the spill collection device to allow for the expansion of the polymer-based media.

27. The apparatus of claim 6 wherein the polymer-based media comprises an agglomeration of polymer material and binding agents formed into a ring.

28. The apparatus of claim 6 wherein the polymer-based media is a nested array of hydrocarbon solidifying fabric arranged to circumscribe a tubular structural stabilizing column.

29. The apparatus of claim 28 wherein the hydrocarbon solidifying fabric is arranged to provide flow channels and allow for the expansion of the polymer-based media.

30. A method of collecting and containing hydrocarbon spills and leaks, comprising the steps of:
    providing a hydrocarbon spill collection apparatus adapted to accumulate and direct hydrocarbon spills and leaks to a hydrocarbon spill containment device;
    mounting the spill collection apparatus proximate but spaced apart from a source of a hydrocarbon spill or leak and in a fixed location thereto so as to be positioned to capture hydrocarbon spills and leaks from the source;
    said hydrocarbon spill containment device having hydrocarbon impermeable walls, a removable perforated lid, and a polymer-based media that includes an amount of a polymer material, said polymer material having a property of acting to absorb and solidify hydrocarbons coming into contact with the polymer-based media, the polymer-based media establishing a distinct chamber for hydrocarbon contaminant absorption and solidification;
    coupling said spill containment device beneath said spill collection apparatus so as to be in fluid communication therewith, whereby hydrocarbon spills and leaks collected by the collection apparatus are funneled to the spill containment device for absorption and solidification within said distinct chamber; and
    retaining the received hydrocarbon spills and leaks within the hydrocarbon spill containment device for solidification by the polymer-based media.

31. The method according to claim 30 further comprising the steps of:
    removing the hydrocarbon spill containment device having a spent supply of the polymer-based media containing solidified hydrocarbons from the hydrocarbon spill collection apparatus;
    removing the lid of the hydrocarbon spill containment device to access the spent supply of polymer-based media;
    replacing the spent polymer-based media with a fresh supply of the polymer-based media having a capacity to absorb and solidify hydrocarbons;
    replacing the lid of the hydrocarbon spill containment device;
    repositioning the spill containment device containing the fresh supply of the polymer-based media beneath said spill collection apparatus so as to be in fluid communication therewith; and
    disposing of the spent polymer-based media containing the solidified hydrocarbons.

32. A method according to claim 30 wherein the polymer material component of the polymer-based media is an elastomer polymer.

33. A method according to claim 30 wherein the polymer-based media is arranged within the spill collection device to create flow channels therethrough.

34. A method according to claim 30 wherein a volume of the polymer-based media is arranged within the spill collection device to allow for the expansion of the polymer as it imbibes and solidifies hydrocarbons.

35. An apparatus for collecting and containing hydrocarbon spills and leaks, comprising:
    a hydrocarbon spill collection apparatus to collect hydrocarbon spills and leaks;
    a spill containment device having hydrocarbon impermeable walls and removable perforated lid; and
    a polymer-based media disposed in the spill containment device to establish a distinct chamber for hydrocarbon absorption and solidification, said polymer-based media including an amount of polymer material having a property of acting to absorb and solidify hydrocarbons coming into contact therewith;
    said spill containment device being mounted beneath said spill collection apparatus so as to be in fluid communication therewith, whereby hydrocarbon spills and leaks collected by the collection apparatus are funneled to the spill containment device for absorption and solidification within said distinct chamber.

36. The apparatus of claim 35 wherein the polymer-based media is a hydrocarbon solidifying fabric having a property of absorbing and solidifying hydrocarbons.

37. The apparatus of claim 36 wherein the hydrocarbon solidifying fabric is arranged in a nested array to establish flow channels therethrough and allow for the expansion of the media as it absorbs and solidifies hydrocarbons.

38. The apparatus of claim 36 wherein the hydrocarbon solidifying fabric is arranged to promote migration of hydrocarbons under capillary attraction throughout the solidifying fabric.

39. The apparatus of claim 35 wherein the polymer-based media comprises an agglomeration of polymer material and binding agents formed into disks.

40. The apparatus of claim 39 wherein the polymer-based agglomeration disks are arranged within the spill collection device to establish flow channels therethrough and allow for the expansion of the media as it absorbs and solidifies hydrocarbons.

41. The apparatus of claim 35 wherein the polymer-based media comprises of a blend of the polymer material and absorbent materials.

42. The apparatus of claim 41 wherein the polymer-based media is arranged within the spill collection device to establish flow channels therethrough and allow for the expansion of the media as it absorbs and solidifies hydrocarbons.

43. The apparatus of claim 35 wherein the polymer-based media comprises of a blend of the polymer material and adsorbent materials.

44. The apparatus of claim 43 wherein the polymer-based media is arranged within the spill collection device to establish flow channels therethrough and allow for the expansion of the media as it absorbs and solidifies hydrocarbons.

45. The apparatus of claim 35 wherein the polymer-based media comprises of a blend of the polymer material and coalescing materials.

46. The apparatus of claim 45 wherein the polymer-based media is arranged within the spill collection device to establish flow channels therethrough and allow for the expansion of the media as it absorbs and solidifies hydrocarbons.

47. The apparatus of claim 35 wherein the polymer-based media comprises stratified layers of a hydrocarbon solidifying fabric and polymer-based agglomeration disks.

48. The apparatus of claim 47 wherein the solidifying fabric is arranged to promote migration of hydrocarbons under capillary attraction throughout the stratified layers of polymer-based agglomeration disks and solidifying fabric.

49. The apparatus of claim 35 further comprising a plurality of layers of coalescing material within said spill collection device and wherein a volume of polymer-based media is arranged within the spill collection device in a stratified array between the layers of coalescing material.

50. The apparatus of claim 49 wherein said spill collection device has at least one open-spaced expansion chamber and wherein a layer of coalescing material is disposed adjacent said open-spaced expansion chamber.

51. The apparatus of claim 35 further comprising a structural stabilizing segment disposed within the spill collection device to maintain alignment of the polymer-based media within the spill collection device.

52. The apparatus of claim 51 wherein said structural stabilizing segment contains a pattern of perforations to allow hydrocarbons to flow throughout the spill collection device and direct the hydrocarbons to the polymer-based media.

53. The apparatus of claim 35 further comprising a structural stabilizing column disposed within the spill collection device wherein said structural stabilizing column is a perforated tube allowing hydrocarbons to flow throughout the spill collection device.

54. The apparatus of claim 53 wherein the perforated tubular structural stabilizing column is circumscribed by a polymer-based agglomeration ring.

55. The apparatus of claim 54 wherein an open-spaced chamber is provided between the polymer-based agglomeration ring and the hydrocarbon impermeable walls of the spill collection device to allow for the expansion of the polymer-based media.

56. The apparatus of claim 35 wherein the polymer-based media comprises an agglomeration of polymer material and binding agents formed into a ring.

57. The apparatus of claim 35 wherein the polymer-based media is a nested array of hydrocarbon solidifying fabric arranged to circumscribe a tubular structural stabilizing column.

58. The apparatus of claim 57 wherein the hydrocarbon solidifying fabric is arranged to provide flow channels and allow for the expansion of the polymer-based media.

* * * * *